United States Patent
Lin et al.

(10) Patent No.: US 10,242,946 B2
(45) Date of Patent: Mar. 26, 2019

(54) CIRCUIT DESIGN HAVING ALIGNED POWER STAPLES

(71) Applicant: GLOBALFOUNDRIES INC., Grand Cayman (KY)

(72) Inventors: Irene Y. L. Lin, Los Altos Hills, CA (US); Lei Yuan, San Jose, CA (US); Mahbub Rashed, Cupertino, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 55 days.

(21) Appl. No.: 15/418,001

(22) Filed: Jan. 27, 2017

(65) Prior Publication Data
US 2018/0218981 A1  Aug. 2, 2018

(51) Int. Cl.
| | | |
|---|---|---|
| *G06F 17/50* | (2006.01) | |
| *H01L 27/02* | (2006.01) | |
| *H01L 23/522* | (2006.01) | |
| *H01L 23/528* | (2006.01) | |
| *H01L 27/118* | (2006.01) | |

(52) U.S. Cl.
CPC ...... *H01L 23/5286* (2013.01); *G06F 17/5077* (2013.01); *H01L 23/5226* (2013.01); *H01L 27/0207* (2013.01); *H01L 27/11807* (2013.01); *H01L 2027/11875* (2013.01); *H01L 2027/11887* (2013.01)

(58) Field of Classification Search
CPC ............. H01L 23/5286; H01L 27/0207; H01L 23/5226; H01L 27/11807; H01L 2027/11875; H01L 2027/11887; H01L 29/66795; H01L 29/7842; G06F 17/5077
See application file for complete search history.

(56) References Cited

U.S. PATENT DOCUMENTS

| | | | |
|---|---|---|---|
| 5,038,192 A | 8/1991 | Bonneau et al. | |
| 6,265,308 B1 | 7/2001 | Bronner et al. | |
| 6,424,563 B2 | 7/2002 | Honigschmid | |
| 9,035,393 B2 | 5/2015 | Ma et al. | |
| 9,496,173 B2 | 11/2016 | Fischer et al. | |
| 2012/0326327 A1* | 12/2012 | Masleid | H01L 23/5226 257/774 |
| 2013/0093022 A1* | 4/2013 | Choi | H01L 27/092 257/369 |
| 2014/0124888 A1* | 5/2014 | Choi | H01L 27/14621 257/432 |
| 2014/0264924 A1 | 9/2014 | Yu et al. | |
| 2015/0270176 A1 | 9/2015 | Xie et al. | |

\* cited by examiner

*Primary Examiner* — Moazzam Hossain
*Assistant Examiner* — Stanetta D Isaac
(74) *Attorney, Agent, or Firm* — Gibb & Riley, LLC; David A. Cain, Esq.

(57) ABSTRACT

A multi-layer integrated circuit structure includes (among other components) a first layer having gate conductors, a second layer having M0 conductors, a third layer having M1 conductors, and a fourth layer having M2 conductors. The M0 and M2 conductors are perpendicular to the gate conductors, and parallel to each other. The M1 conductors connect the M0 conductors to the M2 conductors. The gate conductors are positioned in the first layer in the same locations in the horizontal direction. The M1 conductors are positioned in the third layer in a different location in the horizontal direction that is different from the locations of the gate conductors, so that the M1 conductors do not overlap any of the gate conductors, solving a substantial routing challenge for the input and output contacts.

20 Claims, 11 Drawing Sheets

CIRCUIT DESIGN HAVING ALIGNED POWER STAPLES

BACKGROUND

The present disclosure relates to integrated circuits, and more specifically, to alignment of power staples within such structures.

It is useful to construct multi-layer circuits in a way that VDD and GND can be accessed as easily as possible. One layer is the PC (polysilicon) layer, and this layer holds the logic structure in field effect transistor (FET) gates. M0 is the first metal layer which mostly holds the source/drain contacts and gate contact of the FETs but may also contain interconnections in a horizontal direction. M0 conductors that connect to source, drain or gate are often noted as M0 pin of standard cells. M1 is the second metal layer that is reserved for output pin, power staple as well as routing. M2 is the third metal layer that is reserved for routing. Connections between these layers are called vias where, for example V0 links M0 to M1, and V1 links M1 to M2.

In order to reduce the size of such devices, sophisticated processes, such as self-aligned double patterning (SADP) can be used, and this can follow a uni-directional design style, wherein M0 and M2 are horizontal and M1 is vertical. In the uni-directional design style, a horizontal M1 power rail is not used, and a M1 power staple stitches the M0 and M2 power rail. The function of M1 power staple is therefore equivalent to the via contacts of other nodes that connect two horizontal power rails.

In one design solution, M1 power staples can be added on each side of the standard cell boundary, which is also noted as in cell M1 staple. Alternatively, M1 power staples can be added in the design phase of standard cell placement. In both solutions, the density of the M1 power staples is limited by the size of standard cells. Additionally, M1 power staples complicate the design process, as the power grid design becomes coupled with standard cell IP design, and these designs are usually done by different parties (design company and IP provider). Further, in-cell M1 staple placement results in staggered M1 patterns, which is a substantial patterning and routing challenge for circuit design.

SUMMARY

Structures herein can be, for example, multi-layer integrated circuit structures that include (among other components) a first layer having gate conductors, a second layer having M0 conductors extending in a horizontal direction, a third layer having M1 conductors extending in a vertical direction, and a fourth layer having M2 conductors in horizontal direction. In this multi-layer structure, the second layer is between the first and third layers, and the third layer is between the second and fourth layers. The M0 and M2 conductors are perpendicular to the gate conductors, and parallel to each other. The M1 conductors connect the M0 conductors to the M2 conductors. The gate conductors are positioned in the first layer in regularly spaced locations in the horizontal direction. The M1 conductors are positioned in the third layer in a different location in the horizontal direction that is different from the locations of the gate conductors, so that the M1 conductors do not overlap any of the gate conductors.

More specifically, various multi-layer integrated circuit structures herein include (among other components) a first layer having transistors that have parallel uniformly spaced gate conductors. These structures also have a second layer that includes parallel M0 conductors extending in a horizontal direction, and M0 power rails. The M0 conductors and M0 power rails are perpendicular to the gate conductors, and the M0 conductors are between the M0 power rails within the plane of the second layer.

A first insulator contacts and is between the first layer and the second layer. A third layer that has M1 power staples is also included in these structures. A second insulator contacts and is between the second layer and the third layer. Also, a fourth layer in these structures has parallel M2 conductors and M2 power rails. The M2 conductors and M2 power rails are parallel to the M0 conductors and M0 power rails, and the M2 conductors are between the M2 power rails within the plane of the fourth layer. M2 conductors are applied to connect standard cells by an EDA routing tool in a design process. A third insulator contacts and is between the third layer and the fourth layer.

The M0 conductors have discontinuous middle conductors that connect to gate conductors and are often named as input pins of a standard cell. The M1 power staples do not overlap the discontinuous middle conductors in the vertical direction, and M1 signal conductors are connected to the discontinuous middle conductors of the M0 conductors.

The M1 power staples extend in a vertical direction through the second insulator and the third insulator and connect the M0 power rails to the M2 power rails. Within this nomenclature, the vertical direction is perpendicular to the horizontal direction. Additionally, the gate conductors are positioned in the first layer in the same index locations in the horizontal direction. The M1 power staples are positioned in the third layer in a different index location (of a recurring pattern in the horizontal direction) that is different from the first index locations, so that the M1 power staples do not overlap any of the gate conductors in the vertical direction. Further, the recurring pattern in the horizontal direction is consistent across the multi-layer integrated circuit structure, causing the M1 power staples to all be aligned across the multi-layer integrated circuit structure.

In one example, the M1 power staples are positioned in the very first index location of the M1 recurring pattern; and, while the gate conductors do not follow the index locations. The gate conductors are positioned in locations other than where the first index location of the recurring pattern is located. In a more specific example, the M1 recurring pattern can be three units in length, where the M1 power staples can be positioned in the first unit of the three units, and M1 signal conductor can be positioned in some location other than where the first unit is located.

Additionally, in some circumstances, output contacts, also known as output pins, are positioned in index 1 location within the recurring M1 pattern. However, the M1 power staples are not positioned at the index 1 location within the recurring pattern in the horizontal direction which prevents the M1 conductors from being in locations where the input or output contacts are formed, thereby solving a substantial routing and manufacturing challenge.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, in-cell M1 staple placement results in staggered M1 cut patterns, which is a substantial patterning and routing challenge for circuit design. The systems and methods herein address these issues by providing a standard cell architecture that has first and third metal layers (M0 and M2) in a horizontal orientation, and a second metal layer (M1) in a vertical orientation. With these structures, input pins are on the M0 layer, and output pins are on the M1 layer. In one example, these structures use a period of 3 M1 tracks overlapping a period of 2 gates (3:2 M1/CPP gear ratio (CPP is the contacted poly pitch)). In this example, M0 pins intersects only M1 track #2 and #3, while the M1 track #1 is used for either M1 staple insertion or M1 interconnection. This routed design uses the uni-directional M1 staple, which is a dense M1 staple.

Thus, this structure uses a standard cell library architecture that allows inserting a M1 power staple at a regular index (e.g., every 2CPP) without incurring any conflict with output pins. This not only enables denser power staples, this also avoids staggered M1 cuts on the power rail, greatly simplifying the patterning process. Thus, these structures are very suitable for high performance design, wherein dense staple insertion is desired. By generating uniform M1 power staples, this structure can substantially reduce design variation and thus improve circuit performance.

Because the location of the M1 power staples within the recurring pattern is consistent across the multi-layer integrated circuit structure, this causes the M1 conductors to all be aligned, and this also prevents the M1 conductors from being in locations where the input or output contacts are formed, thereby solving a substantial routing and manufacturing challenge for the conductors, as well as for the input and output contacts.

Figure 1A:
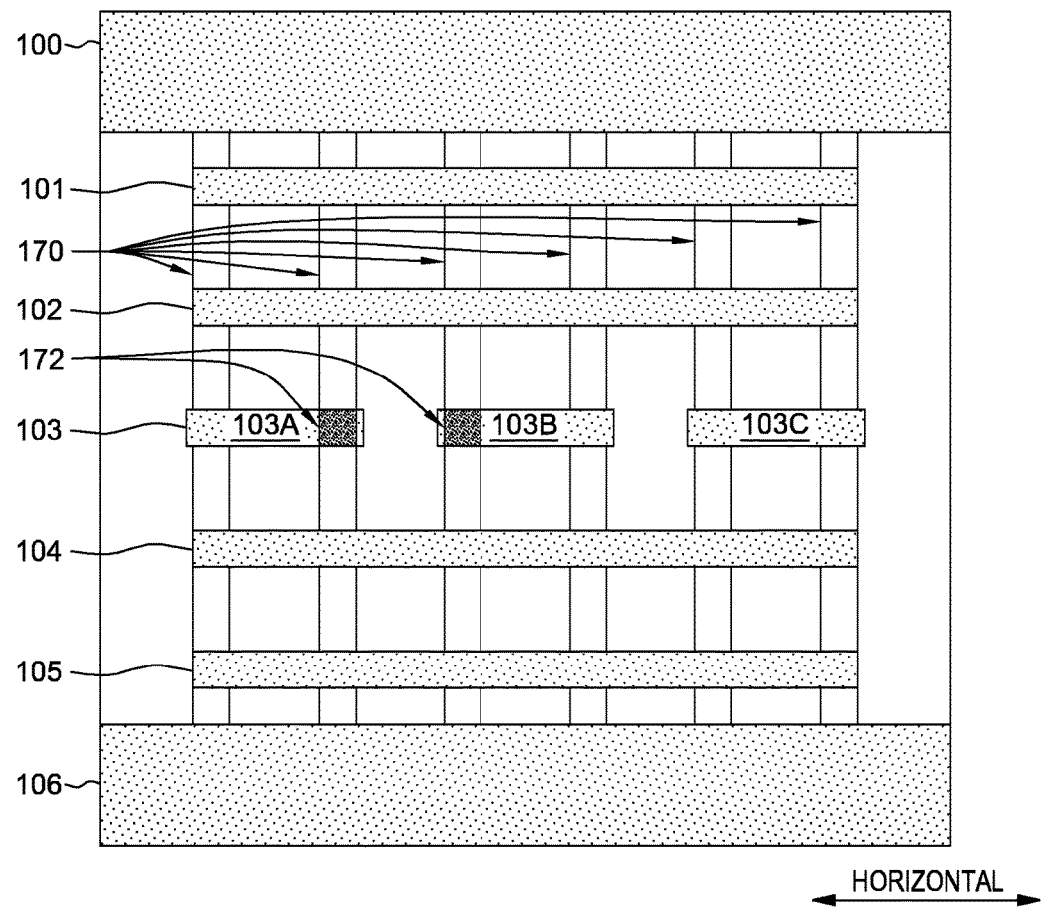
FIG. 1A is a top view schematic diagram illustrating a layer of a cell according to embodiments herein.

FIGS. 1A-4B show various features of exemplary cells of integrated circuit structure herein, where the "A" views (1A, 2A, 3A, and 4A) show a top or plan view of a cell; and the "B" views (1B, 2B, 3B, and 4B) show a side view of the same cell. To avoid clutter, FIG. 1A shows the gate conductors and M0 conductor layer, FIG. 2A shows the M1 conductor layer over the M0 conductor layer, and FIG. 3A shows the M2 conductor layer over the other layers. Further, the dashed boxes in FIGS. 2A, 3A, and 4A illustrate index locations of the recurring M1 conductors in the horizontal direction. In these examples, three sets of index patterns are identified using identification numbers 111-113 for one set of index locations, 121-123 for a second set of index locations, 131-133 for a third set of index locations, etc. Note that the underlying gate conductors 170 are not shown in FIGS. 2A and 3A in order to avoid clutter, and to allow the index locations to be more clearly seen.

Figure 1B:
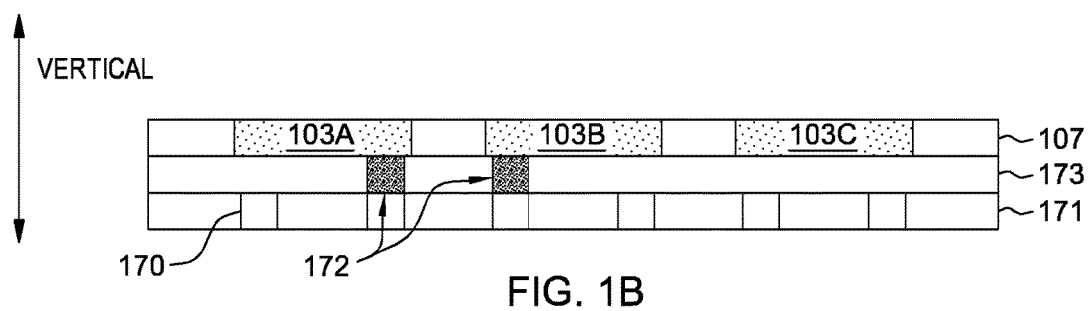
FIG. 1B is a side view schematic diagram illustrating a layer of a cell according to embodiments herein.

Therefore, FIGS. 1A-1B illustrates gate conductors 170 in a transistor layer 171. As would be understood by those ordinarily skilled in the art, the gate conductors 170 are a component of transistor structures; however because transistor structures are well known, and to avoid clutter, such structures are not illustrated or discussed. FIGS. 1A-1B also illustrate the M0 layer (sometimes referred to as the second layer herein) 107 that includes parallel linear M0 conductors 101-105 and M0 power rails 100, 106 extending in a horizontal direction (shown by block arrow in the drawing) overlying the transistor layer 171. FIG. 1B illustrates that a first insulator 173 contacts and is between the first layer 171 and the M0 layer 107.

As shown in FIG. 1A, the M0 conductors 101-105 are between the M0 power rails 100, 106 within the plane of the second layer 107. Further, FIGS. 1A-1B show contacts 172 that electrically connect the conductive portions of the center discontinuous M0 conductor 103 to the gate conductors 170 through the insulator layer 173. Also, as can be seen in FIG. 1A, the M0 conductors 101-105 and M0 power rails 100, 106 are perpendicular to the gate conductors 170 (while layers 107 and 171 are parallel layers).

Figure 2A:
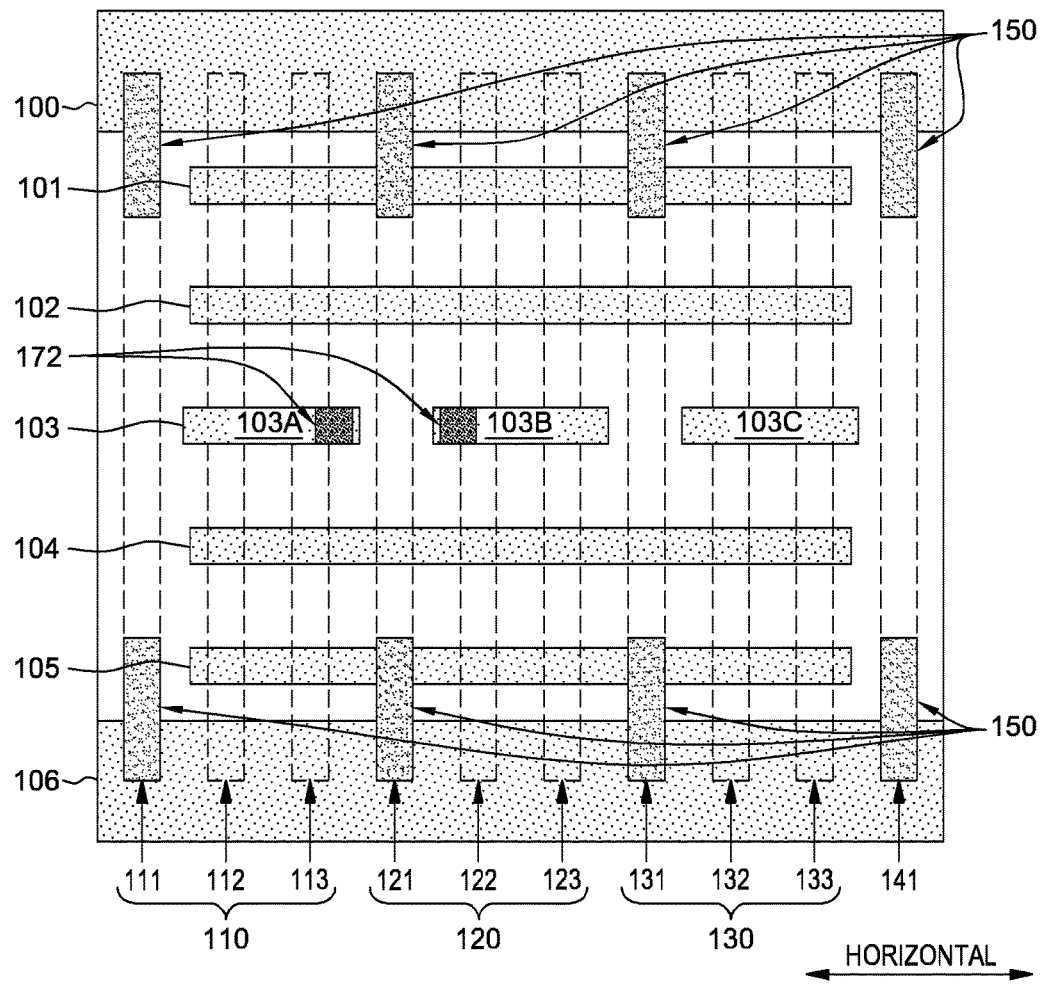
FIG. 2A is a top view schematic diagram illustrating layers of a cell according to embodiments herein.
Figure 2B:
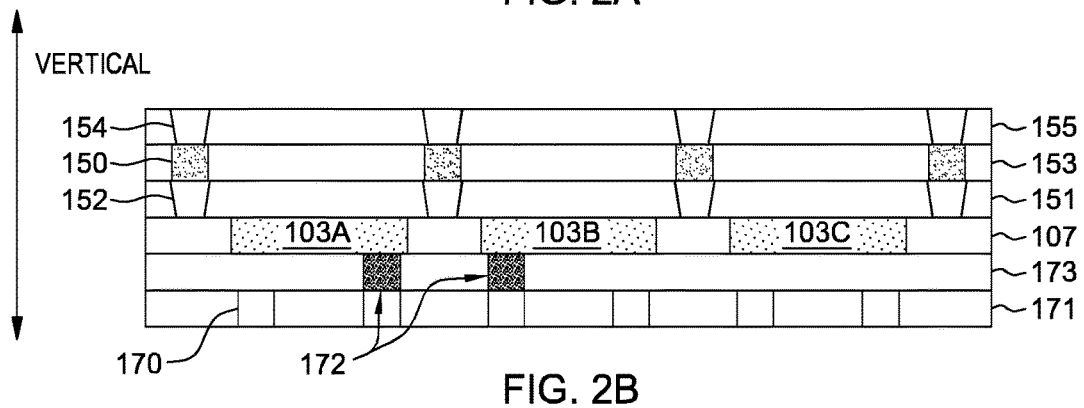
FIG. 2B is a side view schematic diagram illustrating layers of a cell according to embodiments herein.
Figure 3A:
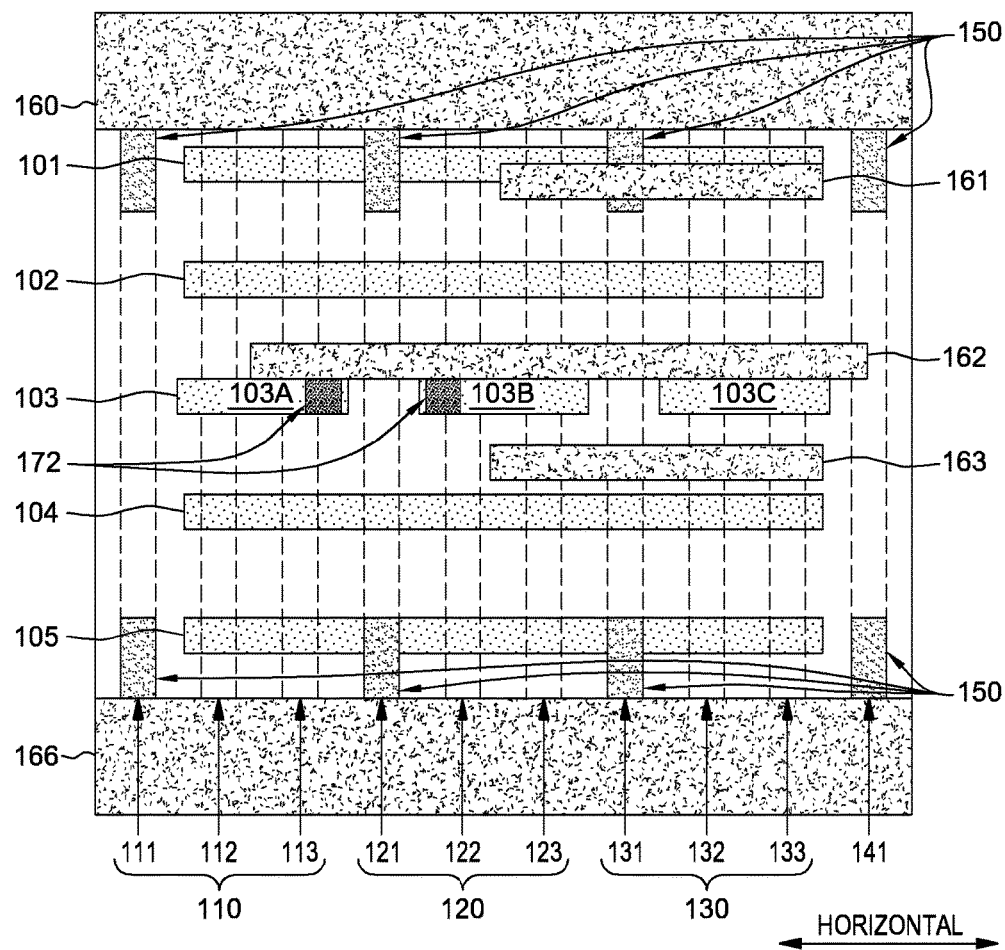
FIG. 3A is a top view schematic diagram illustrating layers of a cell according to embodiments herein.
Figure 3B:
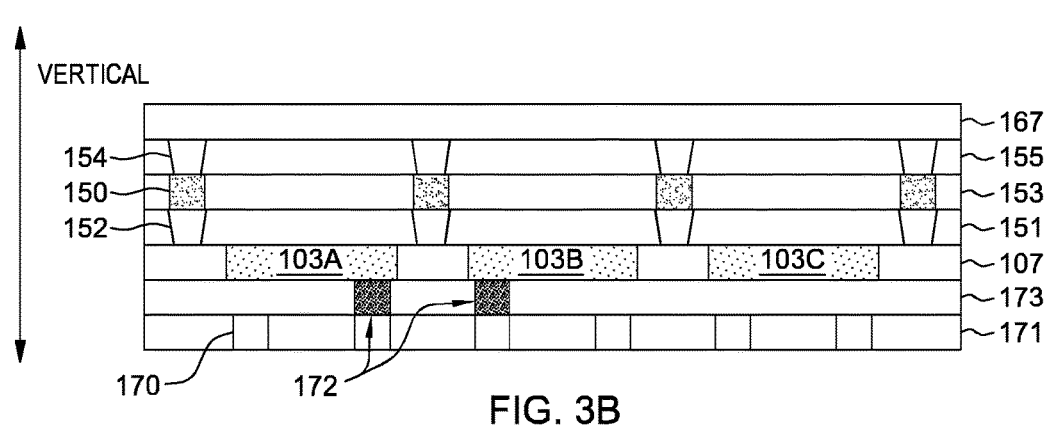
FIG. 3B is a side view schematic diagram illustrating layers of a cell according to embodiments herein.

FIGS. 2A-2B illustrates a third layer 153 that has M1 power staples 150 (vertical conductors). As shown, a second insulator 151 contacts and is between the second layer 107 and the third layer 153. Also, FIGS. 3A-3B illustrates a fourth layer 167 that has parallel linear M2 conductors 161-163 and M2 power rails 160, 166. Thus, the M2 conductors 161-163 are similarly between the M2 power rails 160, 166 within the plane of the fourth layer 167, as shown in FIG. 3A. The M2 wires (conductors) between M2 power rails are routing layers and the actual M2 wires are formed by EDA tools in routing, which are not the same as M0 pattern that is formed at the standard cell level and, therefore, the M0 shapes will be different than the M2 shapes, but may or may not be in the same grid locations.

FIG. 3B illustrates that a third insulator 155 contacts and is between the third layer 153 and the fourth layer 167. FIG. 3B also illustrates that the M1 power staples 150 extend in a vertical direction through the second insulator 151 and the third insulator 155 and connect the M0 power rails 100, 106 to the M2 power rails 160, 166. Within this nomenclature, the vertical direction is perpendicular to the horizontal direction, and is perpendicular to the plane of the various layers 107, 151, 153, 155, 167, 171, 173 discussed above, as shown by block arrows in the drawings.

As noted above, the first layer 171 has transistors that have parallel uniform gate conductors 170. Additionally, the gate conductors 170 are positioned in the first layer 171 in a regular, recurring pattern that is different from the recurring M1 pattern of index locations in the horizontal direction. Thus, for example, the gate conductors 170 are positioned closer to index locations 112, 113, 122, 123, 132, 133, etc., of the recurring M1 pattern in the horizontal direction, and not within index locations (e.g., 111, 121, 131, 141, etc. To the contrary, the M1 power staples 150 are positioned in the third layer 153 in different index locations (e.g., 111, 121, 131, 141, etc.) of the recurring pattern in the horizontal direction. Thus, the gate conductors 170 are always positioned in locations that are different from the index locations where the M1 power staples 150 are always positioned, so that the M1 power staples 150 do not overlap any of the gate conductors 170 when viewed from the top view (e.g., in the vertical direction).

Figure 4A:
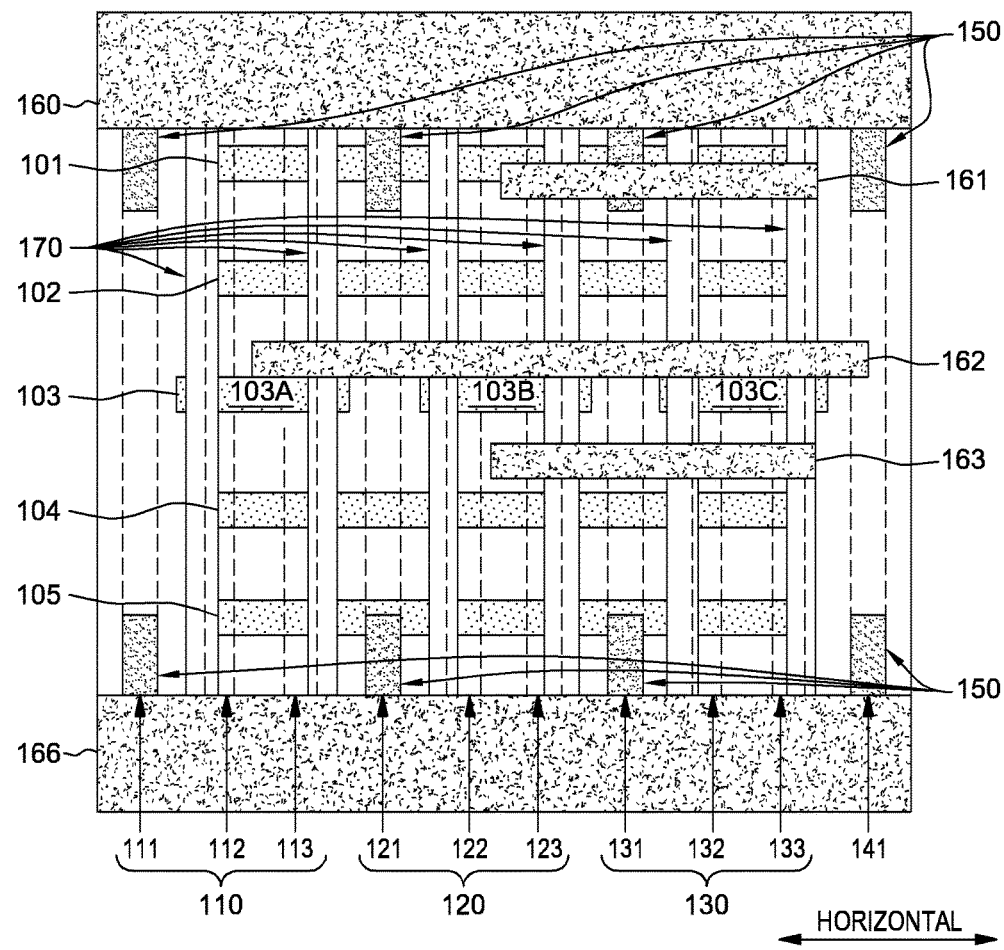
FIG. 4A is a top view schematic diagram illustrating layers of a cell according to embodiments herein.
Figure 4B:
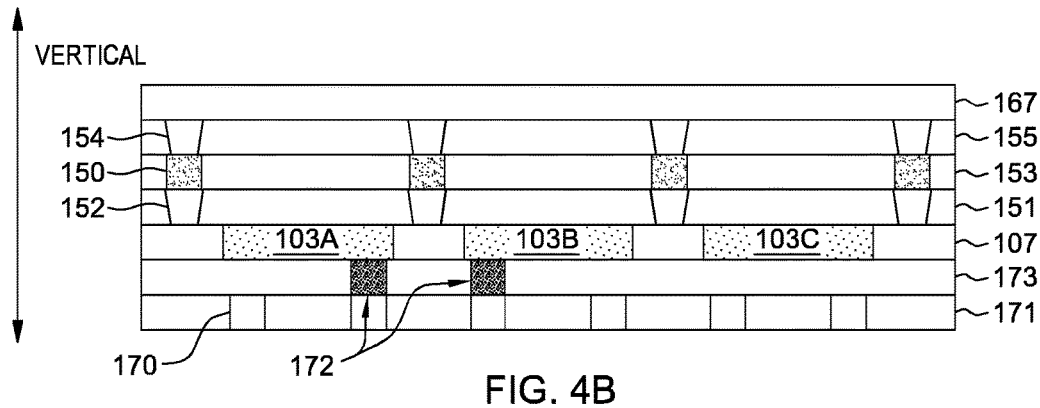
FIG. 4B is a side view schematic diagram illustrating layers of a cell according to embodiments herein.

In other words, the index locations 1, 2, 3 only apply to the M1 conductors, and the gate conductors do not follow the index locations. Actually, for a 3:2 gear ratio, the gate conductor never overlaps with any index, as shown in FIG. 4A. The dimensions of the gate grid and the M1 grid follows the 3:2 gear ratio so that there are three M1 grids in every 2 gate grids, which is labeled as M1 grid of index 1, 2 and 3. In one example, the M1 power staples are positioned in the very first index location of the recurring pattern, and the M1 grids of index 2 and 3 are reserved for M1 conductors that connect to transistor gate via M0 conductors.

Thus, due to 3:2 CPP:M1 gear ratio, there are three M1 grids in every two CPPs. These periodic M1 grids are assigned by index 1, 2 or 3, for example, 111, 112, 113 121, 122, 123, as shown in FIG. 4A. The first M1 conductor is always located in the middle of two gate conductors; and, the second and third M1 conductor will intersect M0 pin to connect gate conductor. The M1 power staples are always positioned in the same index location; for example, the M1 power staples are positioned in the first index location (e.g. 111, 121, 131, 141 etc.); and the M1 power staples can be created in standard cell design level or in design phase. Also, the M1 signal conductors are positioned in the second and third index locations; and, the M1 signal conductors are generated by EDA tool in routing. Further, on some of the first index locations, an output M1 pin is positioned and M1 power staple will be skipped on those grids.

In other words, the M1 power staples 150 are always positioned in the very first index location (e.g., 111, 121, 131, 141, etc.) of the recurring pattern in the horizontal direction, and M1 signal conductors are positioned in other index locations 112, 113, 122, 123, 132, 133, etc. (e.g., positioned after the first index location of the recurring pattern in the horizontal direction). In a more specific example, the recurring pattern in the horizontal direction can be three units in length (111-113, 121-123, 131-133), where the M1 power staples 150 can be positioned in the first unit (e.g., 111, 121, 131, 141, etc.) of the three units, and M1 signal conductors can be positioned in the second and third units (112, 113, 122, 123, 132, 133, etc.) of the three units. Note that because an index length of three is used in this example, the pattern of index locations repeats (110, 120, 130) across a single cell. Thus, even if cells of different sizes are included in an integrated design, the M1 power staples 150, the contacts 172, 180, and the gate conductors 170, will be positioned at regular intervals because the index locations repeat regularly across the circuit design.

Those ordinarily skilled in the art would understand that the recurring pattern could be any number of units in length, and that the M1 power staples could be located at any consistent position(s) within the recurring pattern; and that the exemplary pattern of three units is presented here only for convenience of illustration and ease of discussion and understanding. Thus, the claims presented below are intended to be applicable to recurring patterns of three, less than three, or more than three.

FIGS. 1A and 4A also illustrates that the M0 conductors 101-105 have a discontinuous middle conductor 103A, 103B, 103C, that have conductive portions and insulative portions. The discontinuous middle conductors 103, are separated by insulators along their length, and are between other parallel conductors 101, 102, 104, 105. Input contacts 172 are connected to the discontinuous middle conductor 103 of the M0 conductors 101-105.

The M1 power staples 150 are positioned in index locations where the insulators of the discontinuous middle conductors 103, are located, and extend an insufficient distance from the power rails 100, 106, 160, 166 to overlap the discontinuous middle conductors 103. Thus, the M1 power staples 150 do not overlap the discontinuous middle conductors 103, when viewed from the top or side (e.g., in the horizontal or vertical directions), which provides the designer with many locations to place M1 signal conductor (signal routing or signal wiring), simplifying the design and routing processes; and also simplifies manufacture of the devices by allowing contacts to be formed in regular patterns, and far away from the M1 power staples 150.

Figure 5A:
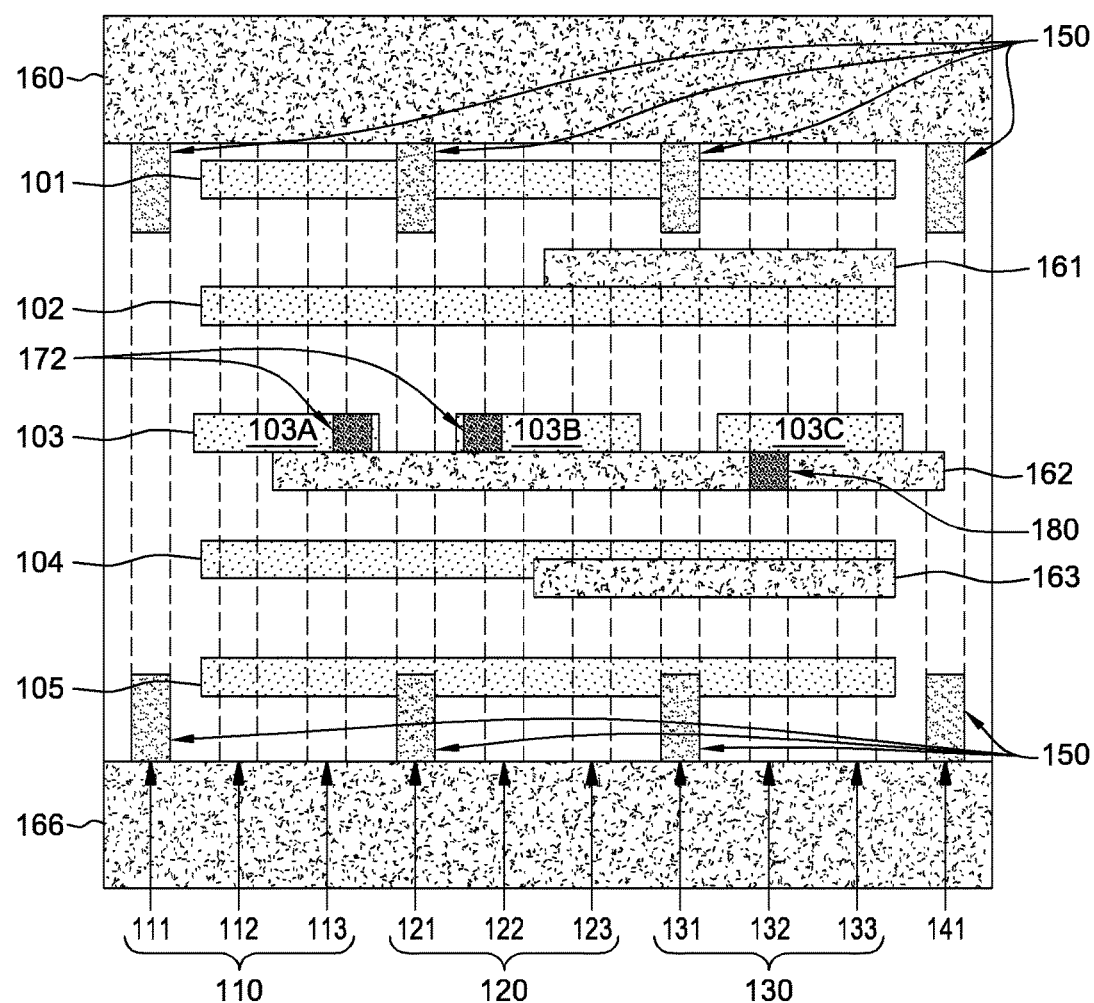
FIGS. 5A-6B are top view schematic diagrams illustrating layers of a cell according to embodiments herein.
Figure 5B:
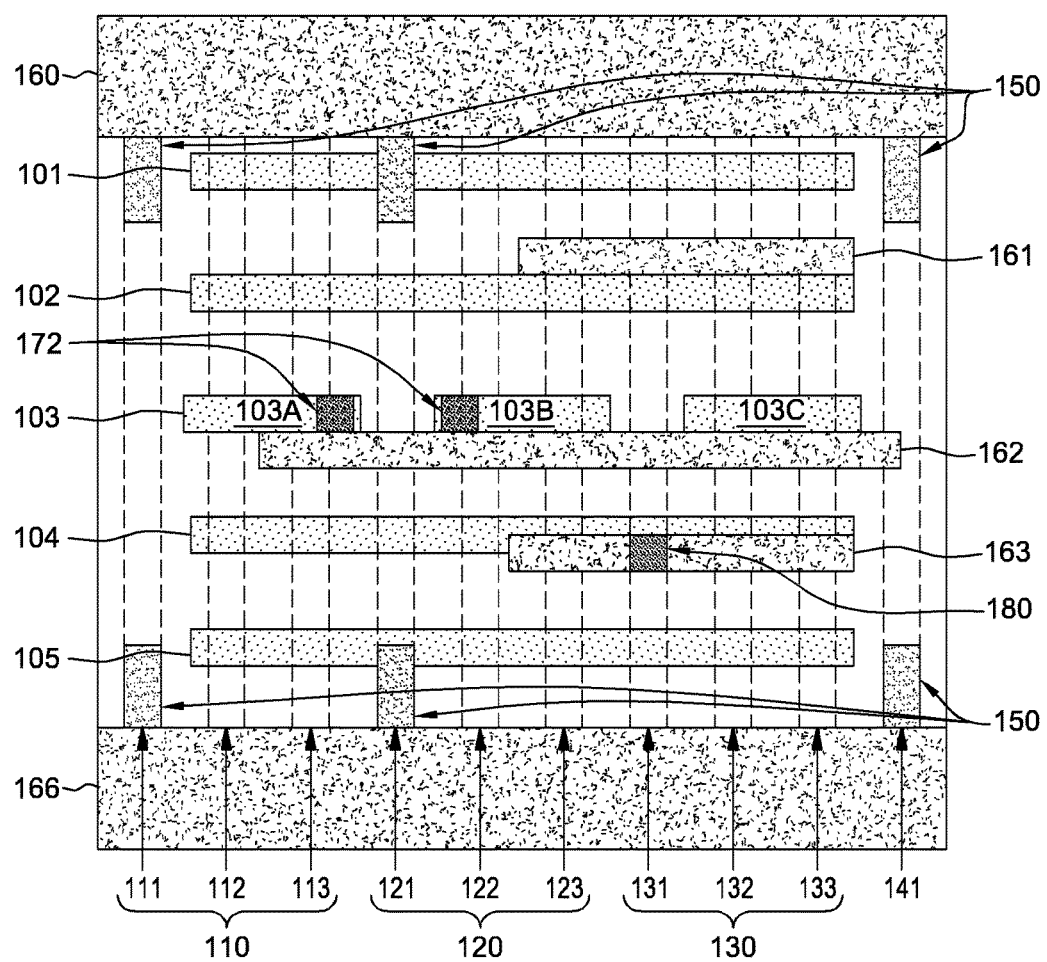

Additionally, as shown in FIG. 5A, an output contact 180 can be positioned at a contact index location (132) within the recurring pattern in the horizontal direction that is different from the index location where the M1 power staple 150 is located (131). However, as shown in FIG. 5B, if the output contact 180 is positioned at a contact index location (131) that is the same as the index location where the M1 power staple 150 would be located (131) according to the M1 power staple being consistent within each recurring pattern, the M1 power staples 150 are not positioned within that recurring pattern. Again, this provides the designer with many locations to place M1 signal conductor, simplifying the design and routing processes and increasing cell density; and this also simplifies manufacture of the devices by allowing contacts to be formed in regular patterns, and far away from the M1 power staples 150.

Figure 5C:
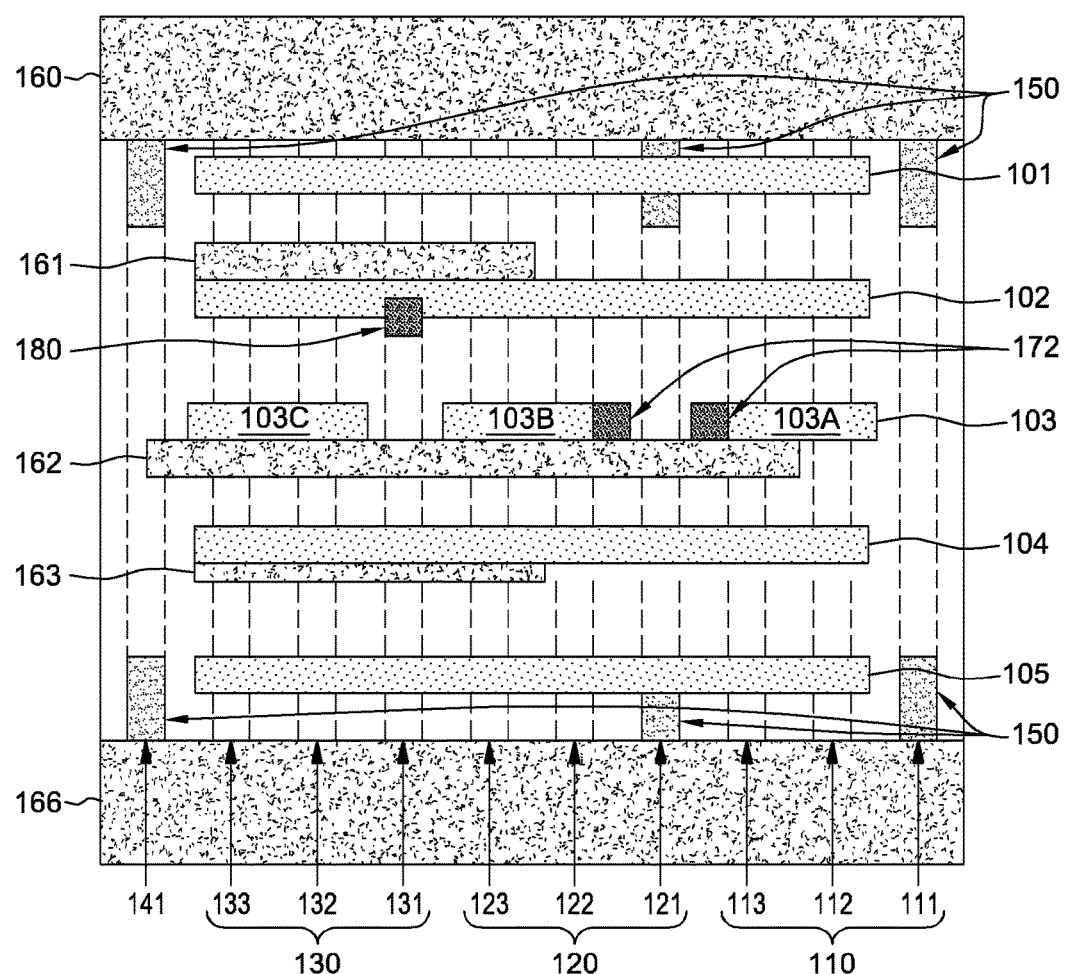
Figure 6A:
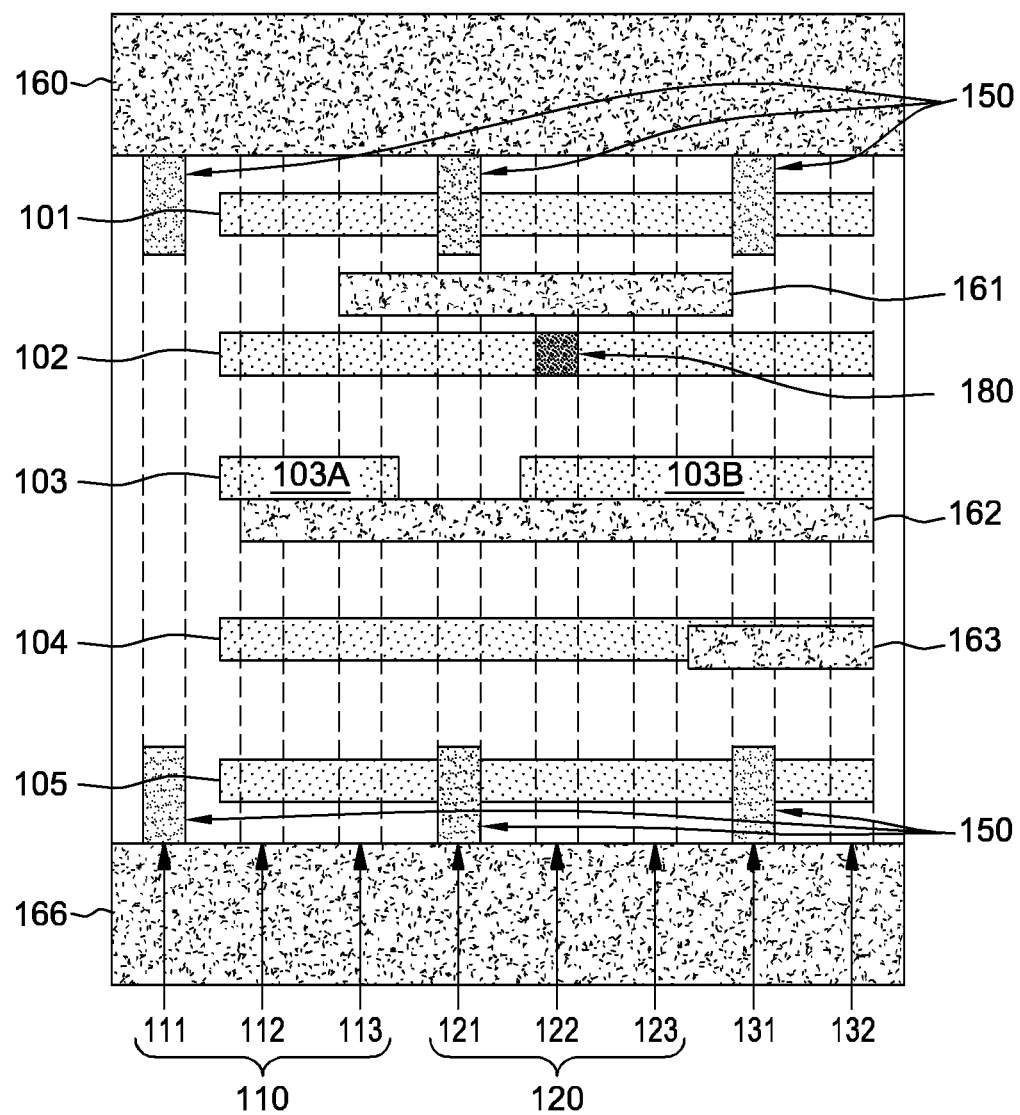
Figure 6B:
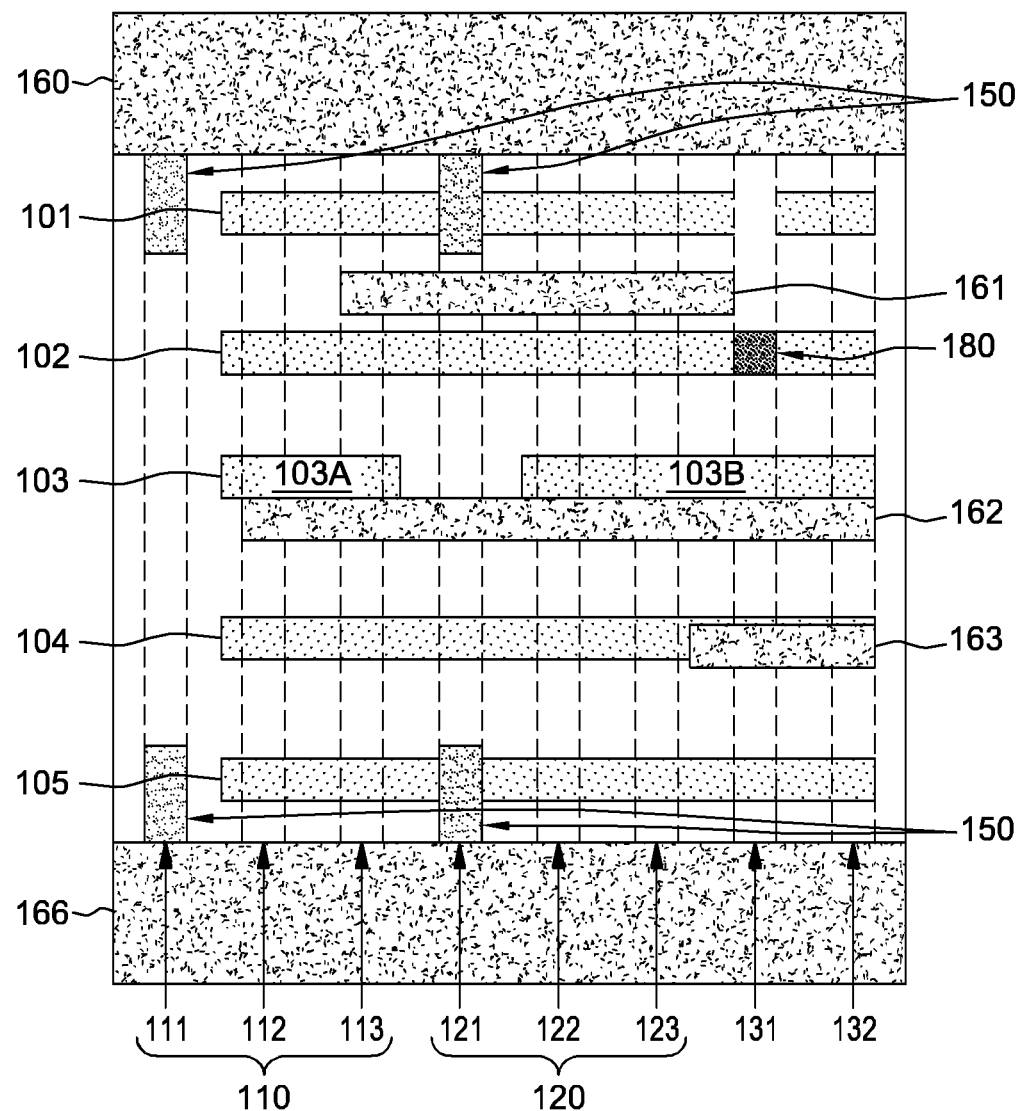

FIG. 5C illustrates the cell shown in FIG. 5B in a reverse, mirror, or flipped configuration. Therefore, even if the cell design herein is flipped, the M1 power staple 150 maintains the alignment with all the other power staples 150 in the structure. FIGS. 1A-4A illustrates "even" cells, the sizes of which are even number of gate pitches. FIGS. 6A-6B illustrates "odd" cells, the sizes of which are odd number of gate pitches. Again, the recurring regular pattern of the power staples 150 provides more options for M1 signal conductor location, increases device density, and simplifies the manufacturing process.

Therefore, gate conductors have a different pattern from the index locations of the M1 conductors. Actually, an index is not used for gate conductor location. Again, there are two types of M1 conductors, M1 power staple and M1 signal routing (M1 signal conductor). The M1 power staples connect the M0 and M2 power rails. The M1 signal routing (M1 signal conductor) connects different standard cells via input pins and output pins). The M1 power staples are always positioned in the first index location at the cell level, while the M1 signal routing is positioned in the second or third index locations by EDA tools in place and route operations. At cell level, the locations always start with unit 1 from left to right. In even cells, the right edge ends at unit 1 as well. Differently, in odd cells, the right edge ends between unit 2 and unit 3. There are recurrent M1 index units in both cell level and circuit level. In the process of placing and routing, standard cells must be placed in such a way that the cell level index matches the circuit level index. The result is that M1 power staple will be unidirectional at the circuit level.

Figure 7A:
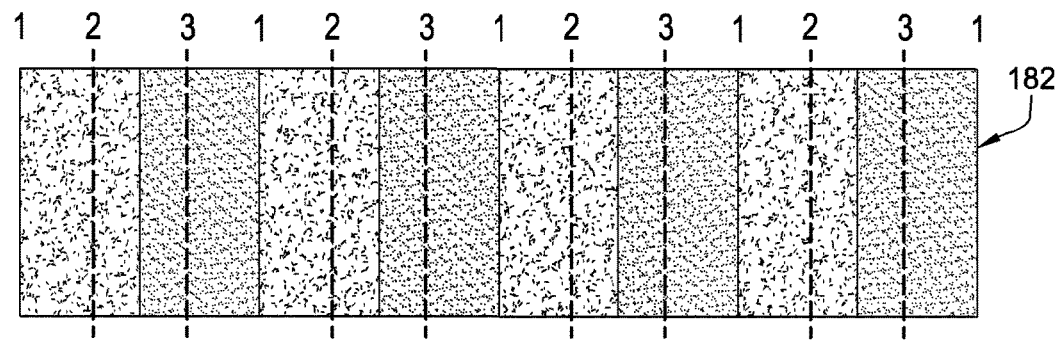
FIGS. 7A-7C are schematic diagrams illustrating odd and even cell arrangement.
Figure 7B:
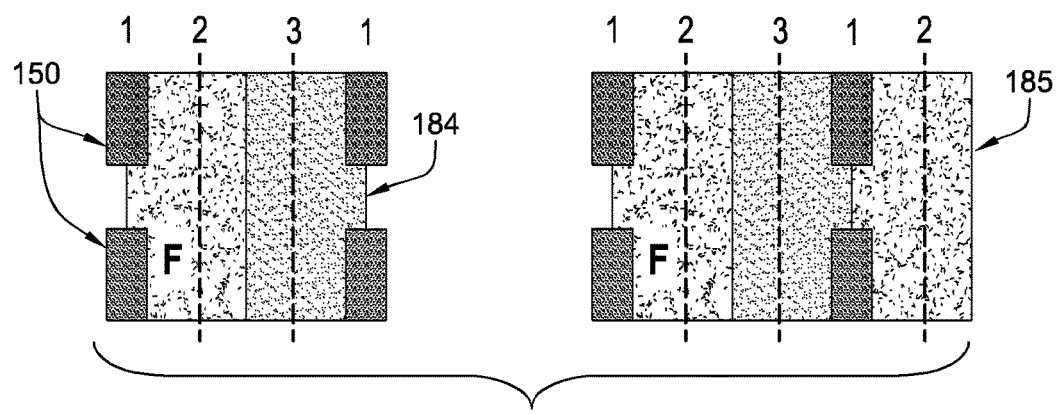
Figure 7C:
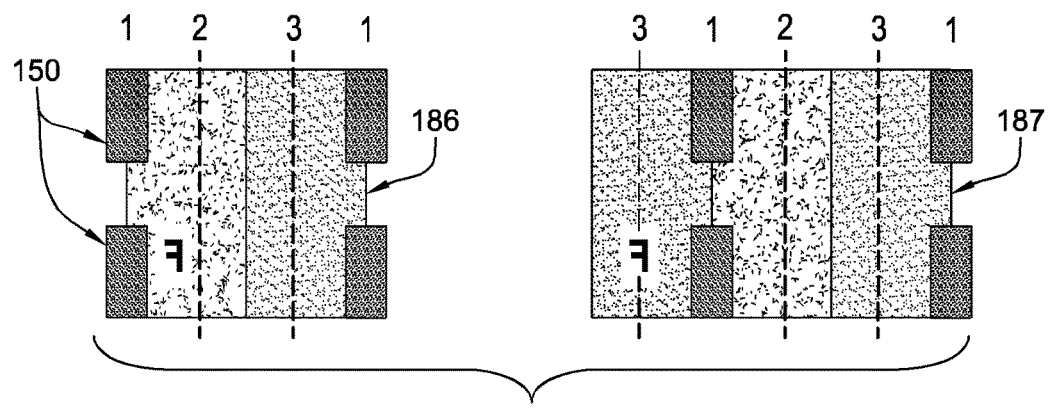

FIGS. 7A-7C are schematic diagrams illustrating odd and even cell arrangement. More specifically, FIG. 7A illustrates the M1 recurring index (1, 2, 3) of the various cells 182 in circuit level illustrated using alternating shading in FIG. 7A. FIG. 7B illustrates the locations of the power staples 150 within even cells 184 and odd cells 185; and FIG. 7C illustrates the locations of the power staples 150 within even cells 186 and odd cells 187 that have their orientation flipped during cell placement relative to the orientation shown in FIG. 7B. As can be seen in the alignment of the odd and even cells 184-187, the indexes must be aligned to circuit level indexes so that the power staples 150 will all be aligned when all the cells are combined together to complete the circuit.

Figure 8A:
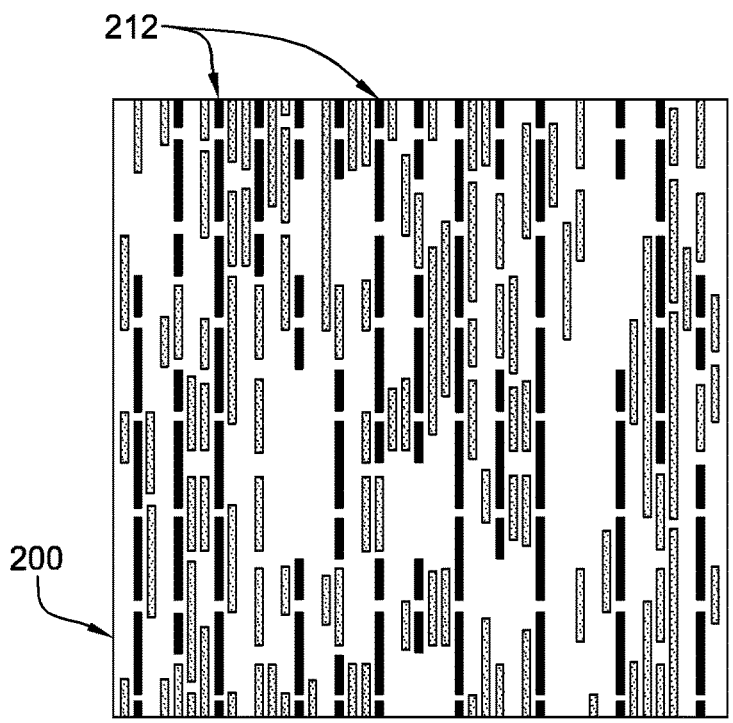
FIG. 8A is a top view schematic diagram illustrating an integrated circuit structure containing cells according to embodiments herein.
Figure 8B:
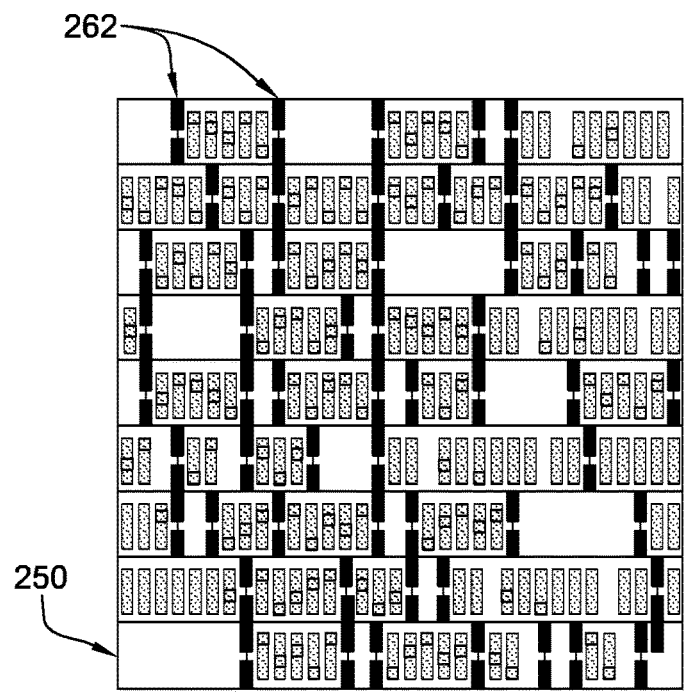
FIG. 8B is a top view schematic diagram illustrating an integrated circuit structure containing cells.

The recurring pattern in the horizontal direction is consistent across all cells of the multi-layer integrated circuit structure, causing all M1 power staples to all be aligned across the multi-layer integrated circuit structure. This also allows all M1 signal conductors to be aligned, and increase M1 power staple density within the multi-layer integrated circuit structure. This is shown in FIG. 8A, where even though different cells have different sizes, the M1 power staples 212 within those cells are all aligned across the full integrated circuit structure 200. To the contrary, FIG. 8B illustrates a design where the M1 grid size is the same as that of gate conductor and M1 staples 262 are located only on each side of cell boundary of different cells which results in the M1 staples 262 being staggered. Therefore, FIG. 8B represents a design that is highly problematic to manufacture because the M1 staples are staggered, while the design provided herein shown in FIG. 8A has all M1 power staples aligned, which is much easier to manufacture, and with much greater M1 power staple density.

Thus, these structures have a repeating pattern (or index) across the circuit (a pattern of 3 index locations in the example used), where the first index location is always used for the M1 power staple or M1 output pin, and the second and third index locations are always used for M1 signal routing. The M0 and M2 conductors are perpendicular to the gate conductors (and only the middle M0 conductors are used for contacts). This allows all the M1 conductors to all be aligned throughout the design (FIG. 8A). In contrast, designs that have 1:1 CPP:M1 gear ratio and place the M1 conductors at the ends of each cell (and the cells have different sizes) results in M1 conductors being staggered (FIG. 8B) which makes routing and manufacturing difficult.

For purposes herein, an "insulator" is a relative term that means a material or structure that allows substantially less (<95%) electrical current to flow than does a "conductor." The dielectrics (insulators) mentioned herein can, for example, be grown from either a dry oxygen ambient or steam and then patterned. Alternatively, the dielectrics herein may be formed from any of the many candidate high dielectric constant (high-k) materials, including but not limited to silicon nitride, silicon oxynitride, a gate dielectric stack of SiO2 and Si3N4, and metal oxides like tantalum oxide. The thickness of dielectrics herein may vary contingent upon the required device performance.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

Within a transistor, the semiconductor (or channel region) is positioned between a conductive "source" region and a similarly conductive "drain" region and when the semiconductor is in a conductive state, the semiconductor allows electrical current to flow between the source and drain. A "gate" is a conductive element that is electrically separated from the semiconductor by a "gate oxide" (which is an insulator) and current/voltage within the gate changes the conductivity of the channel region of the transistor.

Generally, transistor structures are formed by depositing or implanting impurities into a substrate to form at least one semiconductor channel region, bordered by shallow trench isolation regions below the top (upper) surface of the substrate. A "substrate" herein can comprise any material appropriate for the given purpose (whether now known or developed in the future) and can comprise, for example, Si, SiC, SiGe, SiGeC, other III-V or II-VI compound semiconductors, or organic semiconductor structures, etc. The "shallow trench isolation" (STI) structures are well-known to those ordinarily skilled in the art and are generally formed by patterning openings/trenches within the substrate and growing or filling the openings with a highly insulating material (this allows different active areas of the substrate to be electrically isolated from one another).

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of the foregoing. As used herein, the singular forms "a," "an," and "the" are intended to include the plural forms as well, unless the context clearly indicates otherwise.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. An integrated circuit structure comprising:
a first layer having gate conductors;
a second layer having M0 conductors extending in a horizontal direction, the M0 conductors are perpendicular to the gate conductors;
a third layer having M1 conductors; and
a fourth layer having M2 conductors,
the M2 conductors are parallel to the M0 conductors,
the second layer is between the first layer and the third layer,
the third layer is between the second layer and the fourth layer,
the M1 conductors connect the M0 conductors to the M2 conductors,
the gate conductors are positioned in the first layer in first locations in the horizontal direction, and
the M1 conductors are positioned in the third layer in a second location in the horizontal direction that is different from the first locations, so as to not overlap any of the gate conductors.

2. The integrated circuit structure according to claim 1, the M1 conductors are positioned in the very first location of a recurring pattern in the horizontal direction, and the gate conductors are positioned in locations other than where the very first location is located.

3. The integrated circuit structure according to claim 2, the recurring pattern in the horizontal direction is three units in length,
one of the M1 conductors comprises a M1 power staple, and is positioned in the first unit of the three units, the first unit of the three units is positioned in the middle of two gate conductors, and
M1 signal routings are positioned in the second and third units of the three units.

4. The integrated circuit structure according to claim 3, the M0 conductors are formed at the standard cell level and have a discontinuous middle conductor,
the discontinuous middle conductor connects to one of the gate conductors and comprises input pins,
the discontinuous middle conductor is between other parallel conductors, and
the M1 power staple does not overlap the discontinuous middle conductor in a vertical direction that is perpendicular to the horizontal direction.

5. The integrated circuit structure according to claim 4, further comprising M1 signal routing connected to the discontinuous middle conductor of the M0 conductors.

6. The integrated circuit structure according to claim 3, further comprising output contacts positioned in a contact location within the recurring pattern in the horizontal direction, the M1 power staple is not positioned at the contact location within the recurring pattern in the horizontal direction.

7. The integrated circuit structure according to claim 2, the recurring pattern in the horizontal direction is consistent across the integrated circuit structure, causing the M1 conductors to all be aligned across the integrated circuit structure.

8. An integrated circuit structure comprising:
a first layer having parallel linear gate conductors;
a second layer having parallel linear M0 conductors extending in a horizontal direction, the M0 conductors are perpendicular to the gate conductors;
a first insulator that contacts and is between the first layer and the second layer;
a third layer having M1 conductors;
a second insulator that contacts and is between the second layer and the third layer;
a fourth layer having parallel linear M2 conductors, the M2 conductors are parallel to the M0 conductors; and
a third insulator that contacts and is between the third layer and the fourth layer,
the M1 conductors extend in a vertical direction through the second insulator and the third insulator and connect the M0 conductors to the M2 conductors,
the vertical direction is perpendicular to the horizontal direction,
the gate conductors are positioned in the first layer in the same first locations in the horizontal direction, and
the M1 conductors are positioned in the third layer in a second location in the horizontal direction that is different from the first locations, so as to not overlap any of the gate conductors in the vertical direction.

9. The integrated circuit structure according to claim 8, the M1 conductors are positioned in the very first location of a recurring pattern in the horizontal direction, and the gate conductors are positioned in locations other than where the very first location is located.

10. The integrated circuit structure according to claim 9, the recurring pattern in the horizontal direction is three units in length,
one of the M1 conductors comprises a M1 power staple, and is positioned in the first unit of the three units, the first unit of the three units is positioned in the middle of two gate conductors, and M1 signal routings are positioned in the second and third units of the three units.

11. The integrated circuit structure according to claim 10, the M0 conductors are formed at the standard cell level and have a discontinuous middle conductor, the discontinuous middle conductor connects to one of the gate conductors and comprises input pins, the discontinuous middle conductor is between other parallel conductors, and the M1 power staple does not overlap the discontinuous middle conductor in the vertical direction.

12. The integrated circuit structure according to claim 11, further comprising M1 signal routing connected to the discontinuous middle conductor of the M0 conductors.

13. The integrated circuit structure according to claim 10, further comprising output contacts positioned in a contact location within the recurring pattern in the horizontal direction, the M1 power staple is not positioned at the contact location within the recurring pattern in the horizontal direction.

14. The integrated circuit structure according to claim 9, the recurring pattern in the horizontal direction is consistent across the integrated circuit structure, causing the M1 conductors to all be aligned across the integrated circuit structure.

15. A multi-layer integrated circuit structure comprising:

a first layer having transistors comprising parallel linear gate conductors;

a second layer having parallel linear M0 conductors extending in a horizontal direction and M0 power rails, the M0 conductors and M0 power rails are perpendicular to the gate conductors, and the M0 conductors are between the M0 power rails within the plane of the second layer;

a first insulator that contacts and is between the first layer and the second layer;

a third layer having M1 power staples;

a second insulator that contacts and is between the second layer and the third layer;

a fourth layer having parallel linear M2 conductors and M2 power rails, the M2 conductors and M2 power rails are parallel to, the M0 conductors and M0 power rails, and the M2 conductors are between the M2 power rails within the plane of the fourth layer; and a third insulator that contacts and is between the third layer and the fourth layer, the M1 power staples extend in a vertical direction through the second insulator and the third insulator and connect the M0 power rails to the M2 power rails, the vertical direction is perpendicular to the horizontal direction, the gate conductors are positioned in the first layer in the same first index locations in the horizontal direction, and the M1 power staples are positioned in the third layer in a second index location in the horizontal direction that is different from the first index locations, so as to not overlap any of the gate conductors in the vertical direction.

16. The multi-layer integrated circuit structure according to claim 15, the M1 power staples are positioned in the very first location of a recurring pattern in the horizontal direction, and the gate conductors are positioned in locations other than where the very first location is located.

17. The multi-layer integrated circuit structure according to claim 16, the recurring pattern in the horizontal direction is three units in length, the M1 power staples are positioned in the first unit of the three units, the first unit of the three units is positioned in the middle of two gate conductors, and M1 signal routings are positioned in the second and third units of the three units.

18. The multi-layer integrated circuit structure according to claim 17, the M0 conductors are formed at the standard cell level and have a discontinuous middle conductor, the discontinuous middle conductor connects to one of the gate conductors and comprises input pins, the discontinuous middle conductor is between other parallel conductors, and the M1 power staples do not overlap the discontinuous middle conductor in the vertical direction.

19. The multi-layer integrated circuit structure according to claim 18, further comprising M1 signal routing connected to the discontinuous middle conductor of the M0 conductors.

20. The multi-layer integrated circuit structure according to claim 16, further comprising output contacts positioned in a contact location within the recurring pattern in the horizontal direction, the M1 power staples are not positioned at the contact location within the recurring pattern in the horizontal direction.

* * * * *